United States Patent
Legg et al.

(10) Patent No.: US 11,653,400 B2
(45) Date of Patent: *May 16, 2023

(54) WIRELESS COMMUNICATION FOR VEHICLE BASED NODE

(71) Applicant: Blu Wireless Technology Limited, Bristol (GB)

(72) Inventors: Peter Jonathon Legg, Bristol (GB); James Simon Pascoe, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 66 days.

This patent is subject to a terminal disclaimer.

(21) Appl. No.: 16/902,291

(22) Filed: Jun. 16, 2020

(65) Prior Publication Data

US 2021/0392709 A1 Dec. 16, 2021

(51) Int. Cl.
*H04W 76/15* (2018.01)
*H04W 4/44* (2018.01)
*H04W 4/42* (2018.01)

(52) U.S. Cl.
CPC ............ *H04W 76/15* (2018.02); *H04W 4/44* (2018.02); *H04W 4/42* (2018.02)

(58) Field of Classification Search
None
See application file for complete search history.

(56) References Cited

U.S. PATENT DOCUMENTS

| | | | | |
|---|---|---|---|---|
| 8,005,034 B2* | 8/2011 | Dankberg | ............ | H04B 7/1858 370/315 |
| 9,055,537 B2* | 6/2015 | Zhang | .................. | H04W 52/56 |
| 9,179,418 B2* | 11/2015 | He | .......................... | H04W 52/56 |
| 10,306,430 B1* | 5/2019 | Abari | .................... | G05D 1/0055 |
| 10,419,170 B2* | 9/2019 | Meylan | .................... | H04L 1/188 |
| 10,601,695 B2* | 3/2020 | Kyosti | .................... | H04L 43/12 |

(Continued)

FOREIGN PATENT DOCUMENTS

| | | |
|---|---|---|
| CN | 103916918 A | 7/2014 |
| WO | 2019120479 A1 | 6/2019 |

OTHER PUBLICATIONS

Noh Gosan et al: "mmWave-Based Mobile Backhaul Transceiver for High Speed Train Communication Systems", 2017 IEEE Globecom Workshops (GC Wkshps), IEEE, Dec. 4, 2017 (Dec. 4, 2017), pp. 1-5, XP033307269 , DOI: 10.1109/GLOCOMW.2017.8269215.

*Primary Examiner* — Gregory B Sefcheck
(74) *Attorney, Agent, or Firm* — Optimus Patents US, LLC

(57) ABSTRACT

A communication system supports communication between an end node (101) of a vehicle (103) and a remote correspondent node (105) via a fixed network (107) which comprises a plurality of wireless access points (109) with a directional antenna arrangement for mm wave radio communication using directional beams. A vehicle (103) comprises wireless modems (111, 113, 701, 703) employing electronically steerable beamforming directional antennas for establishing mm wave radio communication links to the access points (109). At least one first access point (109) is arranged to transmit multipath environment data for an area supported by the access point to the wireless modems (111, 113, 701, 703). A controller (1101) of the vehicle is arranged to set a diversity property for transmissions of data from the wireless modems to the wireless access points in response to the multipath environment data.

18 Claims, 13 Drawing Sheets

(56) References Cited

U.S. PATENT DOCUMENTS

| | | | |
|---|---|---|---|
| 10,678,637 B2* | 6/2020 | Balasubramanian | ....................... H04N 21/47202 |
| 10,701,617 B2* | 6/2020 | Choi | ..................... H04W 40/22 |
| 10,771,198 B2* | 9/2020 | Jia | ........................ H04L 1/1825 |
| 11,109,449 B1* | 8/2021 | McConnell | .......... H04B 7/0408 |
| 11,122,542 B2* | 9/2021 | Kim | ........................ H04W 4/44 |
| 11,146,365 B2* | 10/2021 | Liu | ....................... H04W 28/04 |
| 11,165,620 B1* | 11/2021 | Bruzzone | ............ H04L 27/265 |
| 2004/0263408 A1* | 12/2004 | Sievenpiper | ............ H01Q 3/46 343/757 |
| 2005/0286650 A1* | 12/2005 | Han | ...................... H04L 1/0625 375/267 |
| 2007/0205955 A1* | 9/2007 | Korisch | ................. H01Q 3/267 343/853 |
| 2008/0181174 A1* | 7/2008 | Cho | ..................... H04B 7/0857 370/329 |
| 2009/0307558 A1* | 12/2009 | Lee | ..................... H04B 7/0656 714/749 |
| 2010/0224725 A1* | 9/2010 | Perlman | .................... B60L 9/00 244/1 R |
| 2010/0234071 A1* | 9/2010 | Shabtay | ................. H04B 7/155 455/562.1 |
| 2011/0250926 A1* | 10/2011 | Wietfeldt | ................. H01Q 9/14 455/525 |
| 2011/0275378 A1* | 11/2011 | Kwon | .................... H04W 72/00 455/437 |
| 2014/0038619 A1* | 2/2014 | Moulsley | ............... H04B 7/024 455/446 |
| 2016/0353420 A1* | 12/2016 | You | ..................... H04L 27/2602 |
| 2018/0048577 A1* | 2/2018 | Gulati | ................. H04W 52/362 |
| 2018/0069606 A1* | 3/2018 | Jung | ...................... H04W 48/20 |
| 2018/0076839 A1* | 3/2018 | Baghel | ..................... H04W 52/283 |
| 2018/0091262 A1* | 3/2018 | Jung | ..................... H04L 1/1812 |
| 2018/0132189 A1* | 5/2018 | Sundararajan | ........ H04W 52/50 |
| 2019/0199295 A1* | 6/2019 | Nader | ..................... H03F 3/211 |
| 2019/0230500 A1* | 7/2019 | Goncalves | ............ H04W 36/14 |
| 2019/0369201 A1* | 12/2019 | Akkarakaran | ........ G01S 1/0428 |
| 2020/0226921 A1* | 7/2020 | Higuchi | .................. H04W 4/40 |
| 2020/0257298 A1* | 8/2020 | Ucar | ..................... H04W 4/021 |
| 2020/0259896 A1* | 8/2020 | Sachs | .................... H04W 12/03 |
| 2020/0274608 A1* | 8/2020 | Luo | ........................ H04B 7/0862 |
| 2020/0280827 A1* | 9/2020 | Fechtel | .................... H04W 4/80 |
| 2020/0312128 A1* | 10/2020 | Higuchi | ........... G08G 1/096791 |
| 2020/0350949 A1* | 11/2020 | Rico Alvarino | ....... H04B 1/713 |
| 2021/0075464 A1* | 3/2021 | Luo | ........................ H04B 1/525 |
| 2021/0099847 A1* | 4/2021 | Uchiyama | ............. H04W 4/40 |
| 2021/0100046 A1* | 4/2021 | Nguyen | ................. H04L 1/1825 |
| 2021/0176780 A1* | 6/2021 | Kang | ................ H04W 72/0473 |
| 2021/0226741 A1* | 7/2021 | Makki | ................. H04W 72/121 |
| 2021/0234580 A1* | 7/2021 | El-Keyi | ................ H04B 7/0452 |
| 2021/0320678 A1* | 10/2021 | Luo | ..................... G06N 3/0445 |
| 2021/0320774 A1* | 10/2021 | Park | .................... H04W 72/046 |

* cited by examiner

WIRELESS COMMUNICATION FOR VEHICLE BASED NODE

FIELD OF THE INVENTION

The invention relates to support of communication with a vehicle based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, improved handover performance, increased over the air communication capacity, improved performance and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; wherein a first access point of the plurality of wireless access points is arranged to transmit multipath environment data for an area supported by the first access point to at least one of the plurality of wireless modems; and a controller of the vehicle is arranged to adapt a diversity property for transmissions of data from the plurality of wireless modems to the plurality of wireless access points in response to the multipath environment data.

The invention may provide improved and/or facilitated operation and/or improved performance for a beamform based mm wave radio communication system supporting (potentially fast) moving vehicles. The approach may, in particular, provide efficient and reliable communication and may in many embodiments provide improved utilization of the available air interface resource. The approach may in many embodiments provide improved consistency and reduced data interruption and/or performance degradation.

The invention may provide improved operation by adapting the communication over the air interface in dependence on the environment. The approach may provide a very efficient way of supporting such an adaption.

The multipath environment data can also be referred to as multipath propagation environment data. The multipath environment data may be any data that is indicative of a property or characteristic of a multipath propagation environment for the area. The multipath environment data may be independent of the vehicle and describe multipath propagation properties of the environment rather than actual links formed to a vehicle. The multipath environment data may reflect an expected nominal and/or average multipath propagation in the area. The area for which multipath environment data is provided may be the entire coverage area of the first access point or may be for only part of the area. The multipath environment data may be indicative of different multipath propagation properties for different parts of the area.

A diversity operation may be any operation that is used for improving/varying the reliability of a communication of data from the vehicle to the access points by potentially using multiple transmissions. The multiple transmissions may comprise transmitting the same packet or protocol data unit (PDU) multiple times, or may involve the transmission of bit sequences derived from input data using coding methods such as network coding. A diversity property may be any property indicative of or related to how many transmissions or links are used to communicate data from the vehicle to the access points. The diversity property may be any property related to a diversity operation.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, controller, and/or end node may be in/on/attached to/move with etc. the vehicle, and may be part of a mobile network that moves with the vehicle.

According to an optional feature of the invention, the diversity property is a data packet retransmission property for data packets transmitted from the wireless modems to the wireless access points.

According to an optional feature of the invention, the data packet transmission repetition property is a minimum number of repeated transmissions of at least a first data packet.

According to an optional feature of the invention, the data packet transmission repetition property is a minimum number of repeated transmissions of at least a first data packet over a single mm wave radio communication link.

According to an optional feature of the invention, the data packet transmission repetition property is a minimum number of repeated transmissions of at least a first data packet to the first access point.

According to an optional feature of the invention, the data packet transmission repetition property is a minimum number of repeated transmissions of at least a first data packet over a plurality of mm wave radio communication links.

According to an optional feature of the invention, the data packet transmission repetition property is a minimum number of repeated transmissions of at least a first data packet over mm wave radio communication links to more than one of the plurality of wireless access points.

According to an optional feature of the invention, the controller is arranged to adapt how many mm wave radio communication links are formed to the plurality of wireless access points in response to the multipath environment data.

According to an optional feature of the invention, the controller is arranged to adapt how many mm wave radio communication links are formed to the first wireless access point in response to the multipath environment data.

According to an optional feature of the invention, the controller comprises a multi path controller arranged to allocate data packets of a data session between the end node and the remote node to a plurality of communication paths, at least some of the plurality of communication paths including different mm wave radio communication links; and where the controller is arranged to adapt the allocation of data packets to the plurality of communication paths in response to the multipath environment data.

According to an optional feature of the invention, the controller is arranged to increase diversity for the transmissions for the multipath environment data indicating an environment with increased multipath propagation.

According to an optional feature of the invention, the multipath environment data comprises an indication of whether the area is a multipath propagation environment or a non-multipath propagation environment; and the vehicle is arranged to adapt the diversity property to increase diversity for the multipath environment data indicating the multipath propagation environment than for the multipath environment data indicating the non-multipath propagation environment.

According to an optional feature of the invention, the multipath environment data comprises an indication of multipath induced fading in the area.

According to an optional feature of the invention, the multipath environment data comprises static environment data.

According to an optional feature of the invention, the multipath environment data is for a predetermined route.

According to an optional feature of the invention, the multipath environment data comprises an indication that the predetermined route includes a tunnel.

According to an optional feature of the invention, the first access point comprises a circuit arranged to determine an uplink diversity characteristic for transmissions received from the plurality of wireless modems, and to adapt a downlink diversity parameter for transmissions of data to the plurality of wireless modems in response to the uplink diversity characteristic.

According to another aspect of the invention, there is provided a method of operation for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the method comprising: a first access point of the plurality of wireless access points transmitting multipath environment data for an area supported by the first access point to at least one of the plurality of wireless modems; and a controller of the vehicle adapting a diversity property for transmissions of data from the plurality of wireless modems to the plurality of wireless access points in response to the multipath environment data.

According to another aspect of the invention, there is provided an apparatus for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the apparatus comprising: a receiver for receiving multipath environment data from a first access point of the plurality of wireless access points; and a controller arranged to adapt a diversity property for transmissions of data from the plurality of wireless modems to the plurality of wireless access points in response to the multipath environment data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
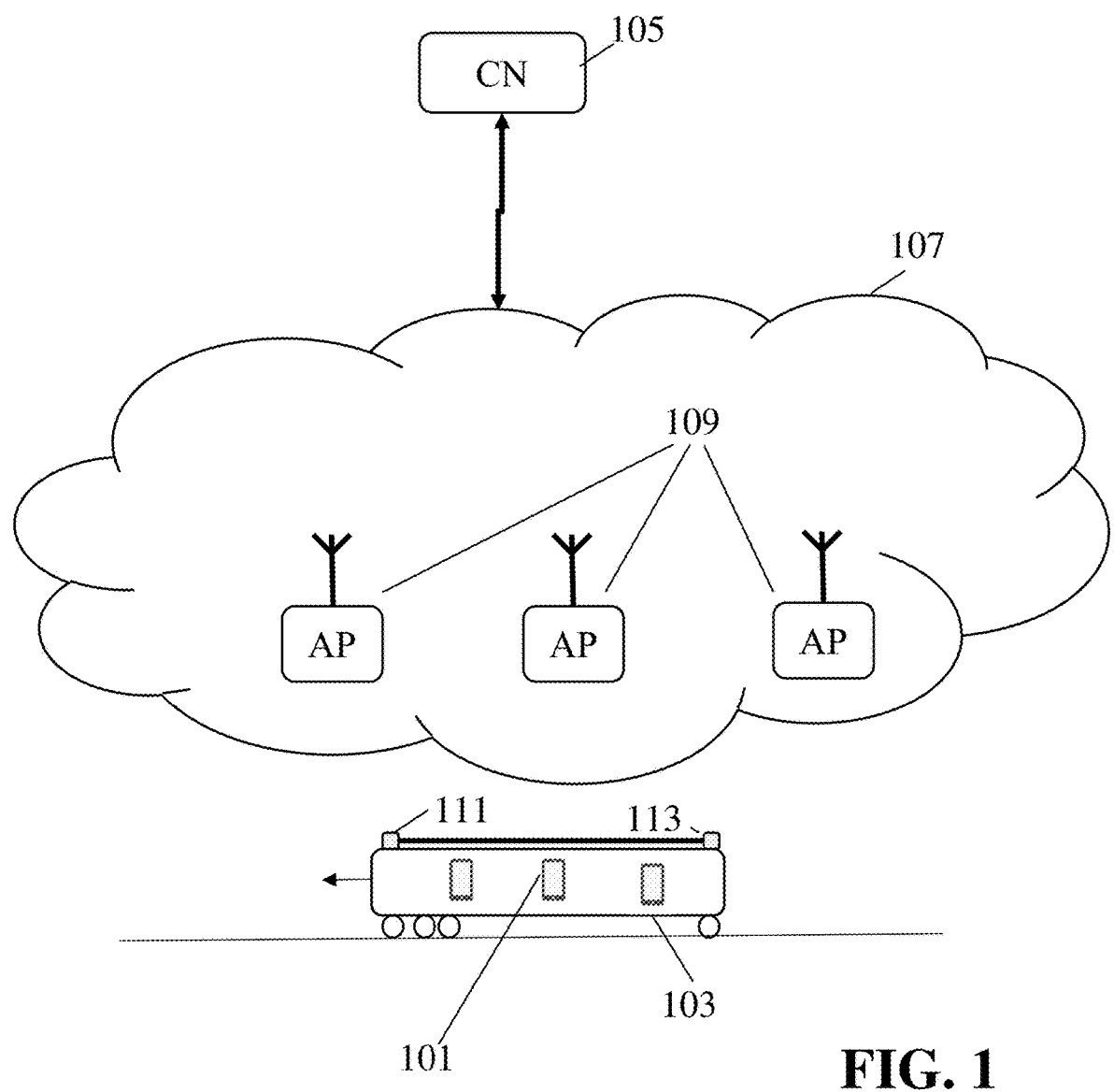
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train.

Figure 2:
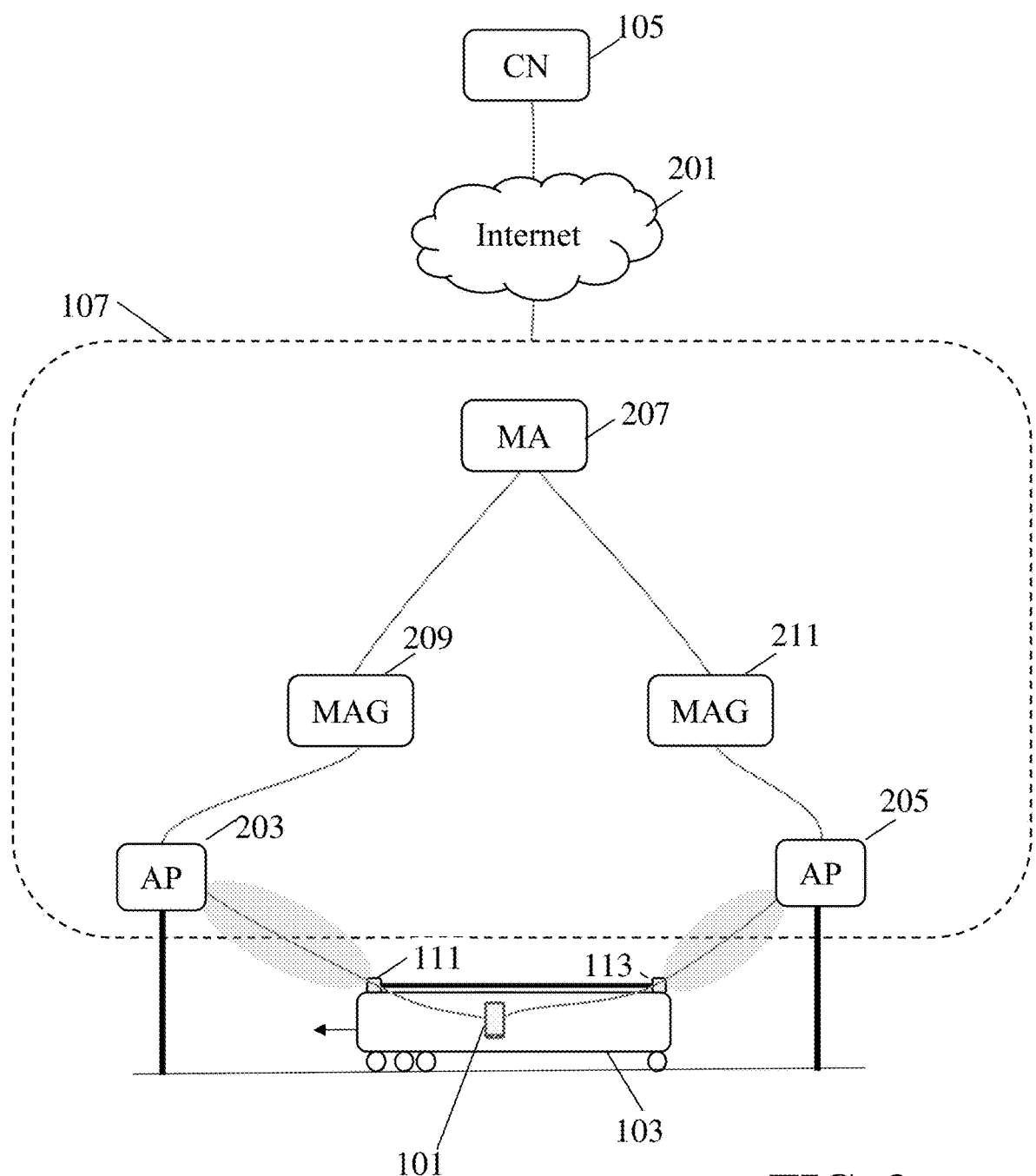
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109, 203, 205 may be substantially colocated and coupled together through network entities that allow short routing paths between them.

Figure 3:
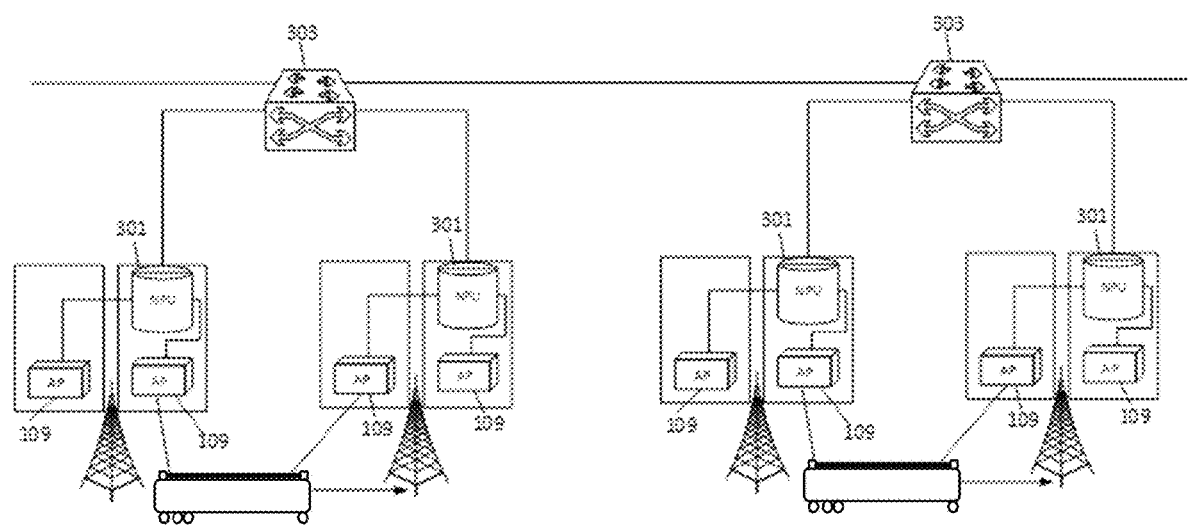
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
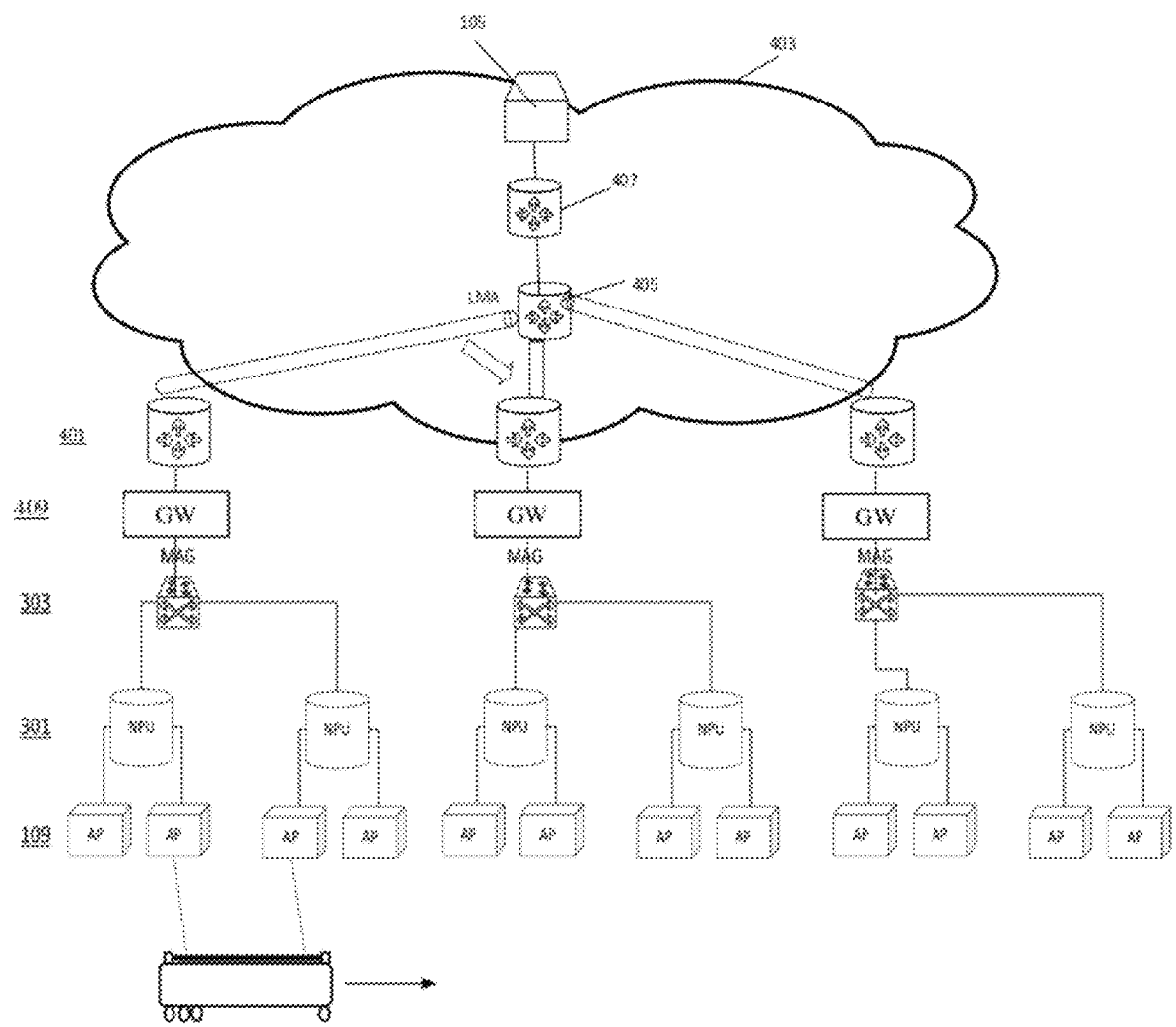
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
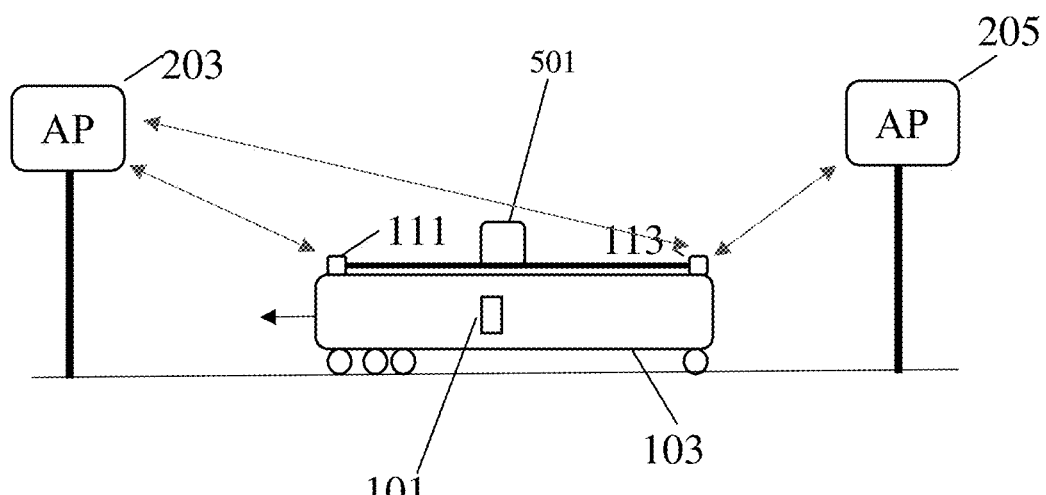
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
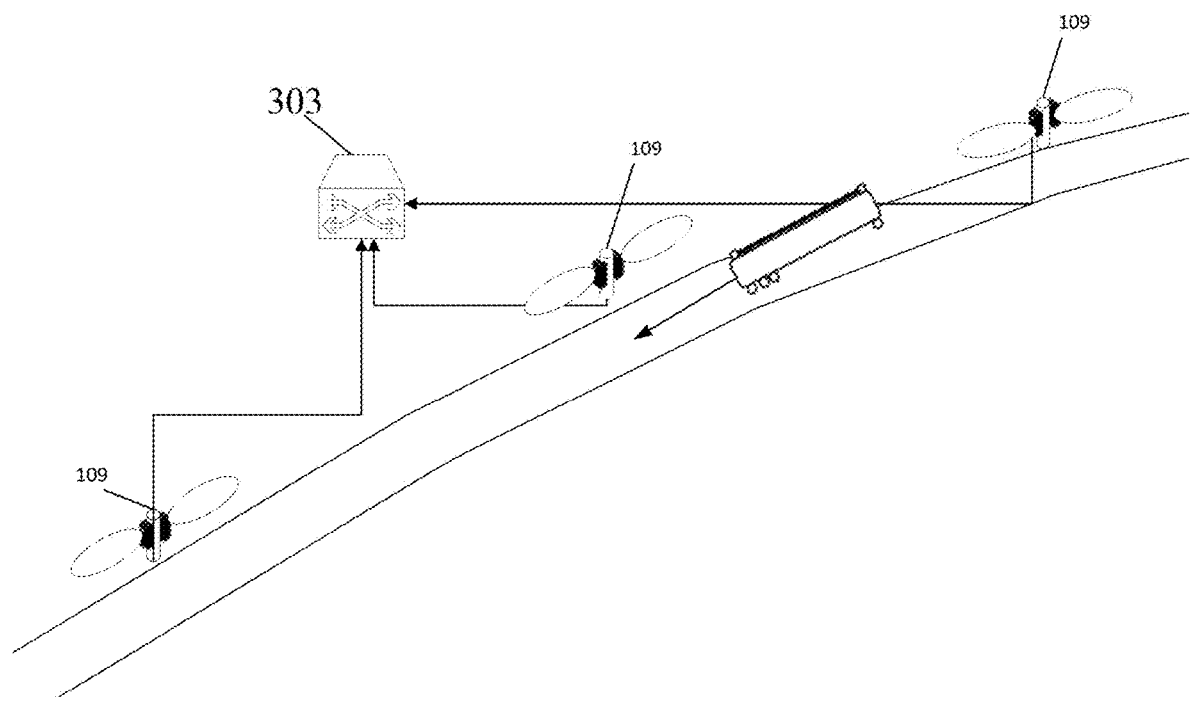
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

Figure 7:
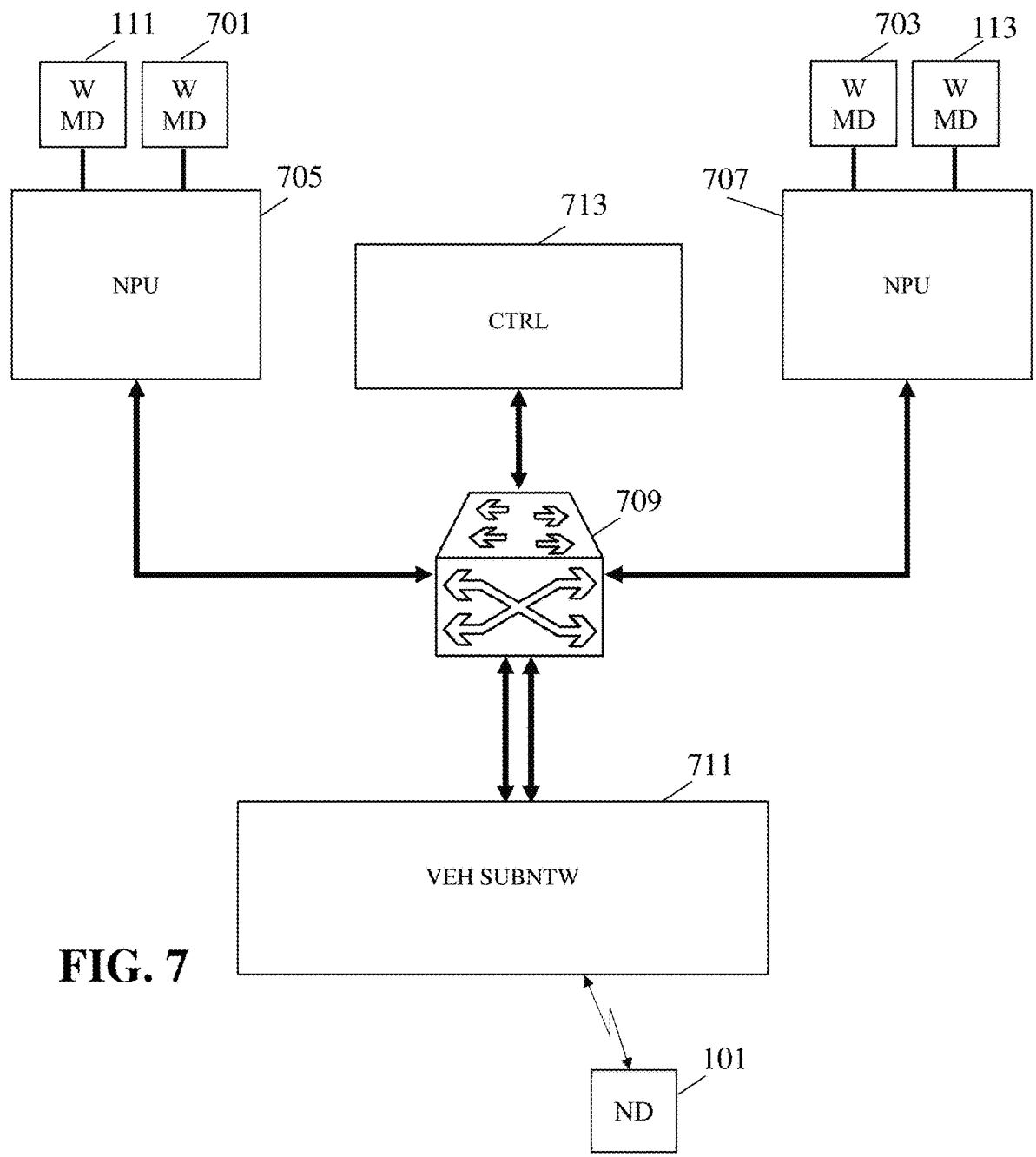
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which is located on the vehicle/moves with the vehicle.

In the example of FIG. 7, the vehicle network comprises four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
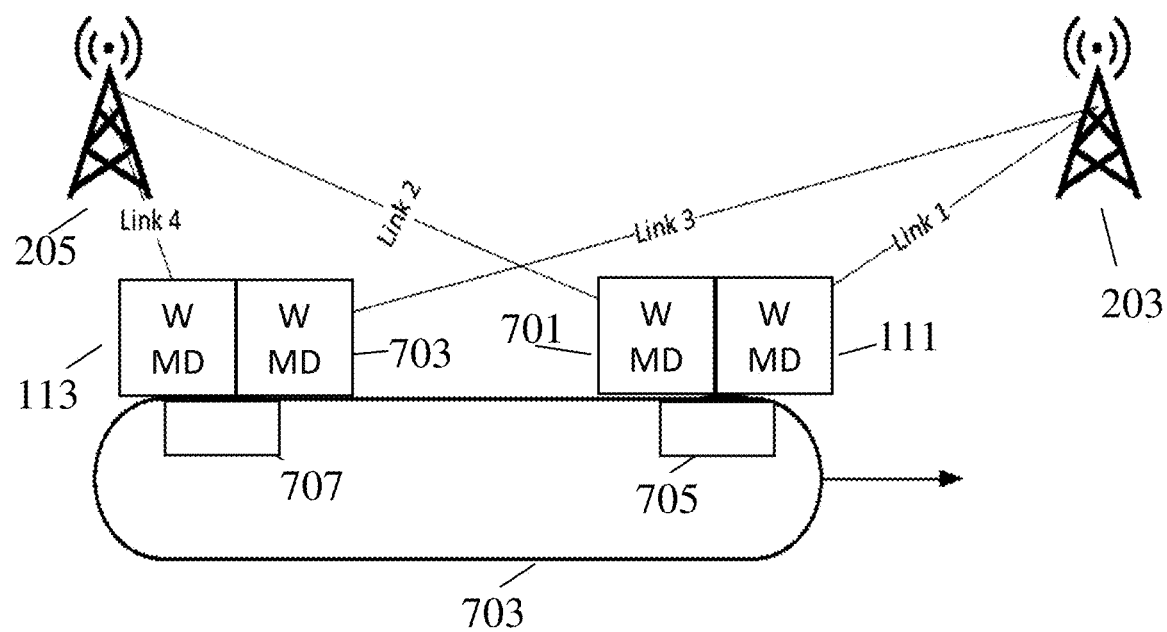
FIG. 8 illustrates an example of elements of a wireless communication system in accordance with some embodiments of the invention.
Figure 9:
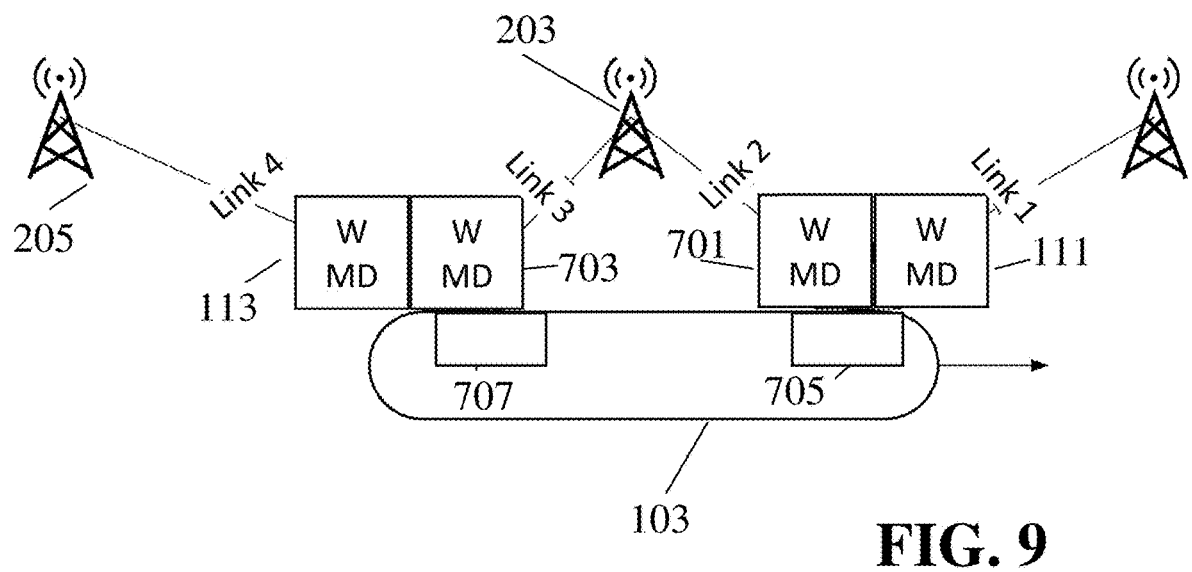
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

The vehicle may typically comprise a plurality of sets of colocated wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding and typically substantially in the same directions will be referred to as aligned wireless modems.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle. In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

As previously mentioned, a major challenge for mm wave radio communication systems in general, and for systems supporting fast moving vehicles in particular, is that of how to optimize communication over the air interface. The wireless communications and links between the access points and wireless modems are subject to very fast and very substantially changing radio conditions and the communication capacity and reliability that can be achieved is typically constrained by the ability of the system to effectively adapt to the prevailing radio conditions. As described above, this may involve dynamically setting up and tearing down links, adapting scheduling over the established links, adapting beamforms for directional antennas etc. However, further improvement of air interface communication is a one of the most desired goals when designing and implementing mm wave radio communication systems.

In the described system, improved air interface communication and utilization is achieved by an approach where the access points provide additional information to the vehicle network which comprises functionality for adapting operation in response to this information. Specifically, the Inventors have realized that for mm wave radio communication systems, and in particular those supporting fast movement, substantially improved operation can be achieved by implementing functionality for the access points to provide multipath (propagation) environment data to the vehicle network and for the vehicle network to include functionality for modifying redundancy properties for the transmission of data from the wireless modems to the wireless access points based on this multipath environment data.

Figure 10:
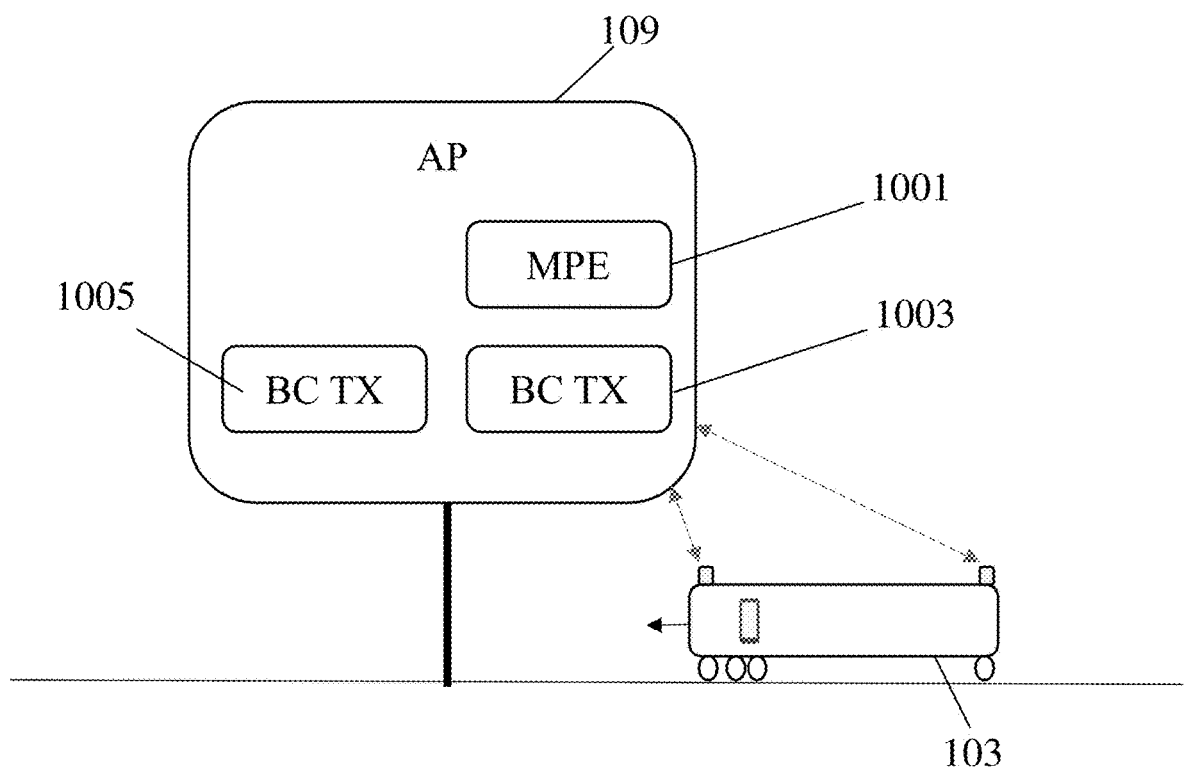
FIG. 10 illustrates an example of elements of a wireless communication system in accordance with some embodiments of the invention.

FIG. 10 shows an example wherein an access point 109 serving a given area comprises a multipath environment data source 1001 which provides multipath environment data to a transmitter controller 1003 which is arranged to transmit the multipath environment data over the air interface to the vehicle 103. In the example, the multipath environment data may be generated by or stored in the multipath environment data source 1001, and the access point 109, itself but in other embodiments, the multipath environment data may be generated or stored remotely, such as in a network management server, and communicated to the access point 109 at appropriate times.

The transmission of the multipath environment data may vary dependent on the preferences and requirements of the individual embodiment. In many embodiments, the multipath environment data may be broadcast on a suitable mm wave carrier. In many embodiments, the access points 109 may be arranged to transmit a broadcast beacon signal that can be detected and decoded by all wireless modems entering the coverage area. This broadcast carrier may include various broadcast data, and in some embodiments, the transmitter controller 1003 may be arranged to include the multipath environment data in the data broadcast on the beacon carrier. For example, a dedicated field may be included to comprise multipath environment data.

In other embodiments, the transmitter controller 1003 may be arranged for the multipath environment data to be transmitted to one or more wireless modems as part of a dedicated transmission. For example, the transmitter controller 1003 may detect that a link is in the process of being setup with a new wireless modem (e.g. by detecting that the MAC address of a wireless modem is a new MAC address) and it may proceed to add the multipath environment data to a data message transmitted to the wireless modem as part of the link initialization. Indeed, in some embodiments, all link initializations may include the transmission of multipath environment data to the wireless modem for which the link is setup.

The multipath environment data is indicative of a multipath property/characteristic for at least part of the area served by the access point. It may specifically be indicative of a degree of multipath propagation in at least part of the area served by the access point. The multipath environment data may be indicative of a likely spread over different paths of the energy received at a wireless modem in the area from transmissions from the access point. The multipath environment data may indicate whether the energy reaching the wireless modem is likely to do so over e.g. a single path, a few paths or over many different paths. The multipath environment data may in indicative of an expected or average number of paths existing from the access point to a wireless modem in the area or may e.g. be a simple indication of whether the environment is considered one in which (sufficient) multipath propagation is present or not.

For example, an access point may be located next to a train track in an open and flat field with no buildings. In such a case, the multipath environment data may indicate that multipath environment is one with very little multipath propagation, and thus where most of the energy received from the transmission from the access point is via a direct line of sight path. However, another access point may be located in a more urban area with potentially many tall buildings. In such a scenario, a large number of reflections may occur, and the transmitted energy is likely to reach the wireless modem via more and potentially a large number of different paths. Accordingly, the multipath environment data for this access point may indicate that there is a high degree of multipath propagation in the environment of the area for which the multipath environment data is provided.

Figure 11:
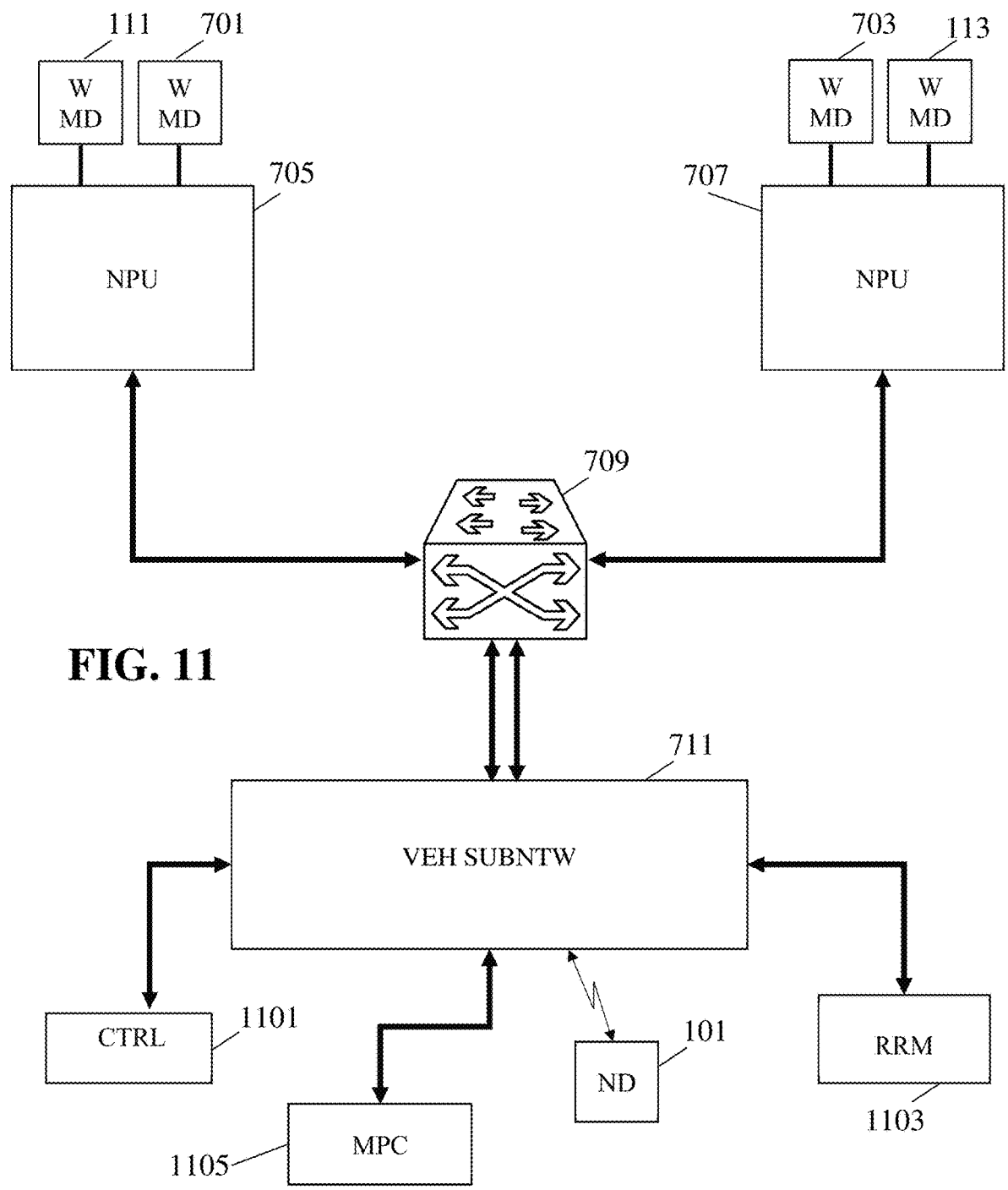
FIG. 11 illustrates an example of elements of a wireless communication system in accordance with some embodiments of the invention.

As illustrated in FIG. 11, the vehicle network may comprise a diversity controller 1101 which is arranged to receive the multipath environment data and to control or adapt a diversity/redundancy property for transmissions of data from at least one of the wireless modems to the wireless access point in response to the multipath environment data.

In the example of FIG. 11, the diversity controller 1101 is shown as a separate controller coupled to the vehicle subnetwork 711. In such a case, the multipath environment data may be routed to the diversity controller 1101 via a routing function e.g. implemented in the wireless modems and/or the NPUs. For example, the diversity controller 1101 may have a MAC or IP address within the vehicle network and a receiving function of e.g. the wireless modems may be arranged to extract the multipath environment data and communicate it to the diversity controller 1101 using this MAC or IP address. Equivalently, the diversity controller 1101 may be arranged to determine an appropriate diversity/redundancy operation to perform, such as how many times a data packet should be retransmitted, and it may transmit control data to another entity which is arranged to execute the operation. For example, a scheduler or radio resource controller may be implemented as part of the wireless modems, NPUs, vehicle subnetwork, or indeed elsewhere, and the diversity controller 1101 may be arranged to transmit control data to such an entity.

However, in many embodiments, the diversity controller 1101 may be integrated with radio management and control functionality and may for example be implemented in the same physical and/or functional device that also implements a radio resource management, control, and scheduling function.

In the system, the uplink transmissions from the vehicle to an access point may thus be modified depending on the multipath propagation environment of the specific access point, and specifically the diversity/redundancy of data transmissions may be modified depending on the typical multipath environment that is experienced by the vehicle when served by the access point.

In mm wave radio communication, multipath propagation may be very significant and in many situations the majority, if not sometimes substantially all, of the received signal may be received via propagation paths that include one or more reflections and which are not via line of sight paths. Indeed, in many scenarios, the presence of different propagation paths may be highly advantageous as it may provide diversity that can effectively be exploited for improved communication. At the same time, mm wave radio communication link may in many environments and situations be able to provide a direct line of sight communication link and this may dominate all other paths resulting in a strong single signal component reaching the antenna.

The multipath propagation environment may very substantially impact on the communication reliability. For example, in many scenarios, it may be preferential that no multipath propagation is present as a single direct path can provide a strong signal component whereas the presence of more than one path may result in different signal components possibly reaching the antenna with different phases. The interference between these different signals may potentially cause deep fades of the received signal (e.g. two signals of high equal strength may be out of phase resulting in a cancellation that prevents the signal from being received).

Indeed, in many scenarios, the optimum situation may be when there is only a single line-of-sight path between transmitter and receiver. Adding additional paths may result in degraded performance as these can result in interference. Some receivers may include an equaliser or matched filter which seeks to resolve and separate individual multipath components such that these can be added constructively in phase. However, in many cases, it may not be feasible to separate multipath components, e.g. due to these not being sufficiently separated in time (or e.g. in space if spatial separation is also exploited by the receiver when trying to resolve multipath components). Thus, whereas multipath equalizers may improve receiver performance, it may typically not be sufficient and may still degrade performance relative to a single direct line of sight path. Specifically, if paths cannot be resolved by the equaliser then this gives fading as the vehicle moves, depending on the relative phases of the components. This may result in potentially high performance loss compared to ideal single path and may be referred to as flat fading. Even if the equaliser can resolve all multipath components there may be a performance loss compared to the single path channel.

The multipath propagation environment may vary substantially e.g. between different environments such as between rural and urban environments, and in the described approach, the vehicle is provided with information about the multipath environment that is considered to exist for the current access point, or for an area/subsection of the coverage area of the access point. It can proceed to adapt the redundancy operation for the uplink transmissions to match this environment and thus can optimize operation for the characteristics of the specific area covered by the access point. Specifically, it may introduce a higher degree of diversity and redundancy when the multipath environment data received from an access point is indicative of a multipath environment that is less supportive of reliable mm wave radio communication than for a multipath environment that is more supportive of reliable mm wave radio communication.

As an example, if the multipath environment data indicates that the area covered by the access point tends to provide a single line of sight propagation path, each uplink data packet may be transmitted only once. However, if the multipath environment data indicates that the area covered by the access point tends to provide a high degree of multipath propagation (and thus have a high risk of flat fading or other type of fading), each uplink data packet may be transmitted several times without relying on retransmission requests.

The approach may provide a substantial improvement for mm wave radio communication and in particular for fast moving vehicles using directional antennas. In such systems, the radio conditions may change extremely fast and by a high degree and the adaptation of the diversity/redundancy operation to the typical multipath conditions can provide improved uplink communication such as specifically more reliable and/or faster uplink transmission of data. For example, for a train moving fast along a train track, the redundancy operation can be dynamically adapted between different access points reflecting how the environments change along the track. Different diversity and redundancy operations can be applied in rural areas, in urban areas, when the train moves through a tunnel etc. Furthermore, early knowledge of the multipath environment when a train modem enters the coverage of an access point allows early mitigation methods to be applied. Any means to detect the multipath environment by the modem itself (for example, by using the channel impulse response returned by its equalizer) will take longer and is prone to error and uncertainty. For example, some forms of flat fading may appear to be due to propagation losses in the channel.

Different multipath environment data may be transmitted in different embodiments and implementations depending on the specific desired performance.

The multipath environment data typically comprises static multipath environment data. The multipath environment data may indicate multipath properties for an area that reflect the static environment rather than reflect dynamic instantaneous multipath propagation. The multipath environment data may reflect expected/nominal multipath properties for the area. The multipath environment data is thus provided for a given area and reflects the nominal propagation conditions but do not describe the instantaneous propagation conditions that are experienced on links Thus, the multipath environment data for a given area reflects the multipath properties independently of whether any links are actually formed or not, or of whether the vehicle is present or not.

In many embodiments, the multipath environment data may be indicative of a prevalence of reflections of the mm wave radio waves of objects in the area. Objects may include buildings, hills, etc.

In some embodiments, the multipath environment data may provide an indication of whether the area is represented as a multipath propagation environment or a non-multipath propagation environment, and specifically a binary indication of whether the area should be treated as a multipath propagation environment or whether it should be treated as a non-multipath propagation environment may be indicated. In such an example, the diversity controller 1101 may be arranged to switch between a multipath propagation environment mode of operation and a non-multipath propagation mode of operation depending on the multipath environment data. The diversity and redundancy may be higher for the non-multipath propagation mode of operation (assuming a single direct line of sight path is prevalent) than for the multipath propagation mode of operation (where fading may occur). For example, repeated transmission of a data packet (without waiting for possible acknowledgement for a retransmission scheme) may be used in the non-multipath propagation mode of operation but not in the multipath propagation mode of operation. Thus, the vehicle may be arranged to adapt the diversity property to increase diversity for the multipath environment data indicating the multipath propagation environment than for the multipath environment data indicating the non-multipath propagation environment.

In some embodiments, more graduated indications of the multipath propagation may be provided. For example, in some embodiments, the multipath environment data may include a K-factor indication. A K-factor may describe a multipath propagation property by indicating the ratio between the power in the direct path and the power in the other, scattered, paths. As another example, the multipath environment data may include a delay spread indication. A delay spread may provide an indication of a difference between the time of arrival of the line-of-sight component and the time of arrival of the last multipath component.

The multipath environment data may in some embodiments comprise an indication of multipath induced fading in the area. For example, rather than merely indicating whether multipath propagation is present or not, it may provide an indication of whether the multipath propagation is likely to result in fading or not. For example, in an environment where multipath propagation is present but with the different paths being likely to have very different propagation times which means they arrive at different times at the receiver (e.g. where the propagation occurs via a line of sight path and over a single path caused a reflection off a building which is at some distance opposite the area), the different paths may not cause flat fading but may be resolvable by an equalizer. In contrast, an environment with the same scenario but with the different paths having substantially similar path lengths, flat fading is likely to occur and the different paths will not be resolvable by an equalizer.

In some embodiments, the multipath environment data may specifically be provided for a for a predetermined route associated with the access point, and specifically one that is served by the access point. In such cases, the multipath environment data may be specific to the predetermined route and thus specific multipath propagation properties along this route may be indicated by the multipath environment data.

In some embodiments, the vehicle may be assumed to travel along a specific predetermined route. For example, the access point may support vehicles travelling along a motorway or may support a train moving along a train track. The multipath environment data may indicate the multipath propagation properties for the entire predetermined route or e.g. only for part of the predetermined route. In some embodiments, the multipath environment data may further provide information of variations in the multipath propagation in the area served and specifically in how the multipath propagation change for different parts of the predetermined route.

For example, the multipath environment data may indicate that the predetermined route includes a section in which only limited multipath propagation is to be expected and a section in which substantial multipath propagation can be expected. In such situations, the system may adapt diversity/redundancy operation as it transitions between sections.

In some embodiments, the multipath environment data may provide specific indications of specific features in the environment/area that will affect the multipath propagation.

In particular, the multipath environment data may indicate that the predetermined route along which the vehicle is expected to move includes a tunnel. For example, if the vehicle is a train moving along a track, the multipath environment data may include an indication that the track moves through a tunnel at some point (or similar if the access point supports vehicles on a road, the multipath environment data may indicate the presence of a road tunnel). The multipath propagation will typically change substantially within a tunnel as propagation within a tunnel tends to be made up of many reflections of the walls. Typically, waves may enter the tunnel at relatively low incidence angles and then bounce off the walls. In fact, a tunnel may often tend to operate similar to a waveguide with the propagation predominantly being by many wall reflections. Thus, an indication that the area for which the multipath environment data is provided includes a tunnel may indicate that at least some of the predetermined route will experience very high degrees of multipath propagation. Accordingly, the diversity controller 1101 may switch operation to increase diversity and redundancy for this area (e.g. using repeated transmissions of each data packet).

Thus, in such cases, the multipath environment data may thus indicate that a specific section of the predetermined route is in a tunnel and thus will have substantially more multipath propagation. In response, the vehicle may proceed to adapt the diversity operation to provide increased diversity in order to compensate for the increased multipath. Various specific approaches will be described in more detail later.

In some embodiments, the multipath environment data may provide an indication of the presence of overhead-line-equipment. overhead-line-equipment comprises the overhead electrified line and structures such as stanchion, booms, cantilevers, catenaries that support the overhead line. The presence of overhead-line-equipment may affect multipath propagation by inducing reflections off the structures and the line itself. Accordingly, by indicating the presence of overhead-line-equipment, the vehicle may adapt the diversity operation to reflect the performance degrading multipath thereby resulting in improved link performance.

The diversity controller 1101 may be arranged to adapt the diversity, and typically the redundancy, operation for uplink (from vehicle to access points) transmissions in response to the received multipath environment data.

The redundancy/diversity property and operation that is adapted and modified based on the received multipath environment data may be different in different embodiments depending on the desired performance.

In many embodiments, the diversity controller 1101 may be arranged to adapt a data packet transmission repetition property for data packets transmitted from the wireless modems to the wireless access points in response to the multipath environment data. Thus, the redundancy/diversity property being modified may be a data packet transmission repetition property for data packets transmitted from the wireless modems to the wireless access points. The data packet transmission repetition property may specifically be indicative of a number of repeated transmissions of the same data.

Specifically, in many embodiments, the diversity controller 1101 may be arranged to bias a transmission operation towards an increased number of repeated transmissions of the same data for the multipath environment data being indicative of an increased degree of multipath propagation.

As an example, the diversity controller 1101 may be arranged to adapt a minimum number of repeated transmissions for the data packets being transmitted from a wireless modem to the access point 109.

In particular, the number of repeated transmissions of a given data packet may typically be one meaning that each data packet is transmitted once. However, if the multipath environment data indicates that the area served by the access point is one in which there is a high degree of multipath propagation, the diversity controller 1101 may adapt the transmission operation such that all data packets are transmitted twice. I When there is little multipath propagation, it is likely that there will be a direct line of sight path and that this may provide a strong signal with little fading. However, if the multipath environment data indicates that it is likely that there will be strong multipath propagation, the diversity controller 1101 may increase redundancy and diversity by repeating transmissions of the same data. This may be considered as a compensation for the increased likelihood of transmission losses caused fading from multipath propagation by increasing redundancy and diversity in the time domain.

In many embodiments, the system may further employ a retransmission scheme. In such an example, a lack of acknowledgement from the access point 109 that a data packet has been received may cause this to be retransmitted by the wireless modem. In such a case, the number of transmissions of a data packet may thus be dynamic and vary depending on the feedback from the access point 109. In such an example, the diversity controller 1101 may not directly control how many times the individual data packet is transmitted as this depends on the acknowledgement received from the access point 109. However, the diversity controller 1101 may in such a system adapt the minimum number of retransmissions of a given data packet, and specifically may adapt the number of transmissions that are made prior to determining that no acknowledgement has been received.

For example, if the multipath environment data indicates that the access point serves an area with weak multipath propagation, the diversity controller 1101 may control the wireless modems to transmit the data packet once and then only retransmit if no acknowledgement is received. If instead the multipath environment data received from the access point indicates that the access point serves an area with substantial multipath propagation, the diversity controller 1101 may control the wireless modems to transmit each data packet twice, e.g. with a suitable delay between transmissions. The data packets are thus retransmitted without waiting to determine if an acknowledgement is received. If no acknowledgement is received within a suitable time interval, further retransmissions will be made.

In some embodiments and examples, the diversity controller 1101 is arranged to control the number of repeated transmissions of the same data packet over the same mm wave radio communication link based on the multipath environment data. E.g. in the examples described above, the transmissions of the data packet may all be over a single mm wave radio communication link between one wireless modem and the access point.

As an example, a number of links may be established between the vehicle and the access points and a scheduler may perform a scheduling operation allocating data to the established mm wave radio communication links. The scheduler may implement a FIFO (First In First Out) buffer for each mm wave radio communication link and allocate data to the different buffers/links in accordance with a suitable scheduling algorithm. In such an embodiment, any retransmission of a data packet may be achieved by allocating the retransmission to the same FIFO buffer. As another approach, when extracting data from the FIFO buffer for communication over the associated mm wave radio communication link, the wireless modem or scheduler may proceed to generate multiple data packets that are transmitted on the mm wave radio communication link.

Such an approach may provide practical and facilitated operation and/or implementation. It may specifically facilitate processing at the access point as it may be easier to combine the repeated data packets and e.g. to perform joint decoding of the data packets.

In some embodiments and examples, the diversity controller 1101 is arranged to control the number of repeated transmissions of the same data packet to the same access point 109 but potentially over different mm wave radio communication links based on the multipath environment data. E.g. in the examples described above, the transmissions of the data packet may all be over one or more mm wave radio communication links between the wireless modems and the same access point.

E.g. in the previous example of a FIFO buffer based scheduler, the scheduler may be arranged to allocate data to be transmitted uplink to a single buffer and link when the multipath environment data indicates a low degree of multipath propagation. However, if the multipath environment data is indicative of substantial multipath propagation being likely, the diversity controller 1101 may control the scheduler to allocate the same uplink data to two buffers/links that are both for the same access point.

In many situations, the vehicle may establish multiple mm wave radio communication links to the same access point, e.g. by forming links from different wireless modems as illustrated in FIGS. 5, 8, 9 and 10. The different links may have different varying properties and if the multipath environment data indicates that there is substantial multipath propagation the diversity controller 1101 may control the scheduler to use the multiple links for repeated transmissions of a data packet. Thus, the multipath environment data may cause the diversity controller 1101 to control the scheduler to transmit the data packet over multiple links to the same access point. This allows for increased redundancy and diversity which can compensate and mitigate the reduced diversity available from multipath propagation.

The access point may receive the data packet from different mm wave radio communication links and proceed to perform a joint reception and possible decoding of the multiple data packets. In some embodiments, the access point may simply select a data packet or e.g. may reject or accept the data packet based on a comparison. For example, if two versions of the same data packet are received via different links, the access point may compare the two versions. If they are identical, the data packet may be considered to be reliably received and an acknowledgement may be sent. If they are not identical, acknowledgement may be withheld (and a non-acknowledgement may e.g. be transmitted) resulting in retransmissions of the same data packet.

Different approaches may be used to receive and combine the parallel data packets. In some embodiments, the two data packets may be individually received, demodulated, and decoded and the resulting data may simply be compared to determine whether errors have occurred. In other embodiments, e.g. soft decision data may be generated for each data packet and the decoding may involve combining the soft decision data, e.g. simply by selecting the data value with the highest estimated reliability in cases where the decoded data conflicts. In yet other embodiments, a full joint decoding of the data packets may be performed.

The use of different mm wave radio communication links to the same access point for repeat transmissions of a data packet may in some scenarios provide improved and possibly optimized performance in terms of trade-off between data reliability, facilitated operation etc. In particular, it may provide increased link diversity and redundancy without requiring any data exchange or communication between different access points.

In some embodiments and scenarios, the diversity controller 1101 may be arranged to determine a minimum number of repeated transmissions a data packet with these repeated transmissions including transmissions over mm wave radio communication links to more than one access point. Specifically, in addition to the access point for which the multipath environment data is received, the wireless modems of the vehicle 103 may be used to setup mm wave radio communication links to neighboring access points as illustrated in e.g. FIG. 5, 8, 9, 10.

In such an example the scheduler may include a buffer for each link including those of different access points. If the diversity controller 1101 in such an embodiment determines that the multipath environment data indicates a high amount of multipath propagation, it may be determined that more than one transmission of a data packet is desired and it may proceed to allocate data for the data packet to links to different access points.

Such an approach may provide improved performance as mm wave radio communication links to different access points may be more uncorrelated than links to the same access point and thus may provide increased diversity. However, the approach requires communication in order to combine the received data from the parallel transmissions. For example, the access point transmitting the multipath environment data may have be designated as the current main access point serving the vehicle 103. Data packets transmitted to other access points may in this example be associated with a MAC address for the main access point and the receiving access point may be arranged to forward the received data packet to the main MAC address. The main access point may then proceed to combine the received data packets. Thus, whereas using links to different access points may be provide increased diversity gain, it may be associated with an increased processing and communication overhead.

In some embodiments, the diversity controller 1101 may be arranged to determine how many mm wave radio communication links are formed from the vehicle 103 to wireless access points in response to the multipath environment data.

In many embodiments, the vehicle network may comprise a radio resource manager 1103 which is arranged to set up and tear down mm wave radio communication links to the access points as the vehicle 103 moves. The radio resource manager 1103 may perform the dynamic mm wave radio communication link management over the air interface.

The radio resource manager 1103 may receive radio propagation information from the wireless modems, such as signal strength indications, signal to noise estimates, bit error rate measures etc. The data may be received for active links as well as for example from beacons or broadcast transmissions from access points. The radio resource manager 1103 may also receive indications of e.g. data throughputs for existing links, such as e.g. average data rate, frequency of retransmissions due to lack of acknowledgement etc. Based on such information, the radio resource manager 1103 may determine that new links between different wireless modems and access points become feasible and may proceed to initialize the establishment of such links. Similarly, it may determine that existing links are no longer usable or suitable and may proceed to terminate such links.

The radio resource manager 1103 may be closely interworking with the scheduler or schedulers and in many embodiments be implemented in the same device and integrated with the scheduler or schedulers. In other embodiments, one or more of the schedulers may be remote from the radio resource manager 1103 and e.g. communicate with this via the vehicle subnetwork 711. For example, a dedicated scheduler may be implemented for each wireless modem, e.g. at the wireless modem itself or at the serving NPU, and these may exchange information with the radio resource manager 1103. The radio resource manager 1103 may for example control the initialization and termination of links with the individual wireless modems and NPUs performing the required actions to carry out these operations as well as scheduling over the available links. In some embodiments, the scheduling function may be distributed over the radio resource manager 1103 and the wireless modems/NPUs with for example the radio resource manager 1103 allocating data to different modems or NPUs and the wireless modems and NPUs then scheduling data on the links supported by them. It will be appreciated that many different approaches for distributing the described functionality may be used and that the approach chosen for a specific embodiment may depend on the specific requirements for that embodiment.

The radio resource manager 1103 may operate a suitable algorithm for determining which mm wave radio communication links to establish as active links. The algorithm may consider the multipath environment data and the diversity controller 1101 may thus control the radio resource manager 1103 to vary a diversity property based on the multipath environment data. In many embodiments, the radio resource manager 1103 may be integrated with the diversity controller 1101 and indeed the radio resource manager 1103 can be considered part of the diversity controller 1101.

Specifically, a decision of whether to establish a new mm wave radio communication link or of whether to terminate an existing mm wave radio communication link may be dependent on the multipath environment data. In many embodiments, the number of active mm wave radio communication links that are preferred may depend on the multipath propagation indicated by the multipath environment data.

For example, if the multipath environment data indicates that there is likely to be substantial multipath propagation, the radio resource manager 1103 may be instructed to try to setup as many links as possible. It may then proceed to reduce the requirements for a link to be considered to be feasible, e.g. the requirements for signal strength or signal to noise ratio for a beacon to be sufficient to initiate a new link may be reduced. Similarly, the radio resource manager 1103 may proceed to maintain active links for longer, e.g. by increasing the bit error probability necessary for an active link to be considered to be too high to maintain the link.

If instead the multipath environment data indicates that there is likely to be a very low amount of multipath propagation, the radio resource manager 1103 may be instructed to try to maintain as few links as possible. It may increase the requirements for a link to be considered to be feasible, e.g. the requirements for signal strength or signal to noise ratio for a beacon to be sufficient to initiate a new link may be increased. Similarly, the radio resource manager 1103 may proceed to be more likely to reduce the number of active links, e.g. by reducing the bit error probability necessary for an active link to be considered to be too high to maintain the link.

In such an approach, the number of links established from the vehicle 103 to the access points will depend on the received multipath environment data with more links being more likely for multipath environment data indicating substantial multipath propagation than for multipath environment data indicating no or little multipath propagation. In particular, in many embodiments, the diversity controller 1101 may be arranged to bias mm wave radio communication link establishment from the wireless modems to the access points towards an increasing number of links for the multipath environment data indicating an increased level of multipath propagation.

In some embodiments, the diversity controller 1101 may directly set the minimum number of mm wave radio communication links depending on the multipath environment data. However, in many embodiments a more flexible biasing towards fewer or more links may be implemented, e.g. as described in the examples above.

In some embodiments, the diversity controller 1101 may be arranged to adapt the number mm wave radio communication links between the vehicle 103 and the plurality of access points as whole. Indeed, in some embodiments, the diversity controller 1101 may control the radio resource manager 1103 to be biased towards establishing links to different access points in order to increase diversity.

In some embodiments, the diversity controller 1101 may be arranged to adapt how many mm wave radio communication links are formed to the wireless access point from which the multipath environment data is received. For example, if the multipath environment data indicates that there is little multipath propagation, the diversity controller 1101 may control the radio resource manager 1103 to establish only a single link from one wireless modem to the access point. However, if the multipath environment data indicates that there is likely to be substantial multipath propagation, the diversity controller 1101 may instruct the radio resource manager 1103 to seek to establish as many mm wave radio communication links to the access point 109 as possible. This may possibly include multiple links from the same wireless modem to the access point, e.g. using different directional antenna characteristics, but may in many embodiments involve links being established from different wireless modems of the vehicle. The approach may provide an adaptation of diversity operation that can compensate for variations in likelihood of multipath caused fading while at the same time allowing low complexity operation. It may allow the access points to support the adaptive operation in isolation from other access points. This may facilitate operation and may e.g. facilitate introduction of the functionality to existing deployed systems.

The description has focused on a situation where the multipath environment data indicates the amount of multipath propagation and where diversity is increased for increasing multipath propagation. However, in some scenarios, some multipath propagation may be advantageous if it can be resolved by an equalizer or matched filter. In particular, if the path lengths are substantially different, the different paths can be represented by different taps and a constructive combination of the signal components can be achieved. However, if the path lengths are similar, it may not be possible to resolve the paths.

Thus, in some embodiments, the multipath environment data may provide an indication of whether the paths can be resolved or not. For example, it may indicate whether the environment is one which is likely to provide no multipath propagation, fading multipath propagation that cannot be resolved, or multipath propagation that can be resolved and combined constructively. In such a case, the diversity controller 1101 may be arranged to increase diversity, e.g. by repeating transmissions of a data packet, if the multipath environment data is indicative of fading multipath propagation but not if it is indicative of no multipath propagation or of resolvable multipath propagation.

In some embodiments, the communication between the end node 101 and the correspondent node 105 may be routed via multipath controllers. Such multipath controller may split a flow into multiple subflows which are then combined at the complementary multipath controller.

Figure 12:
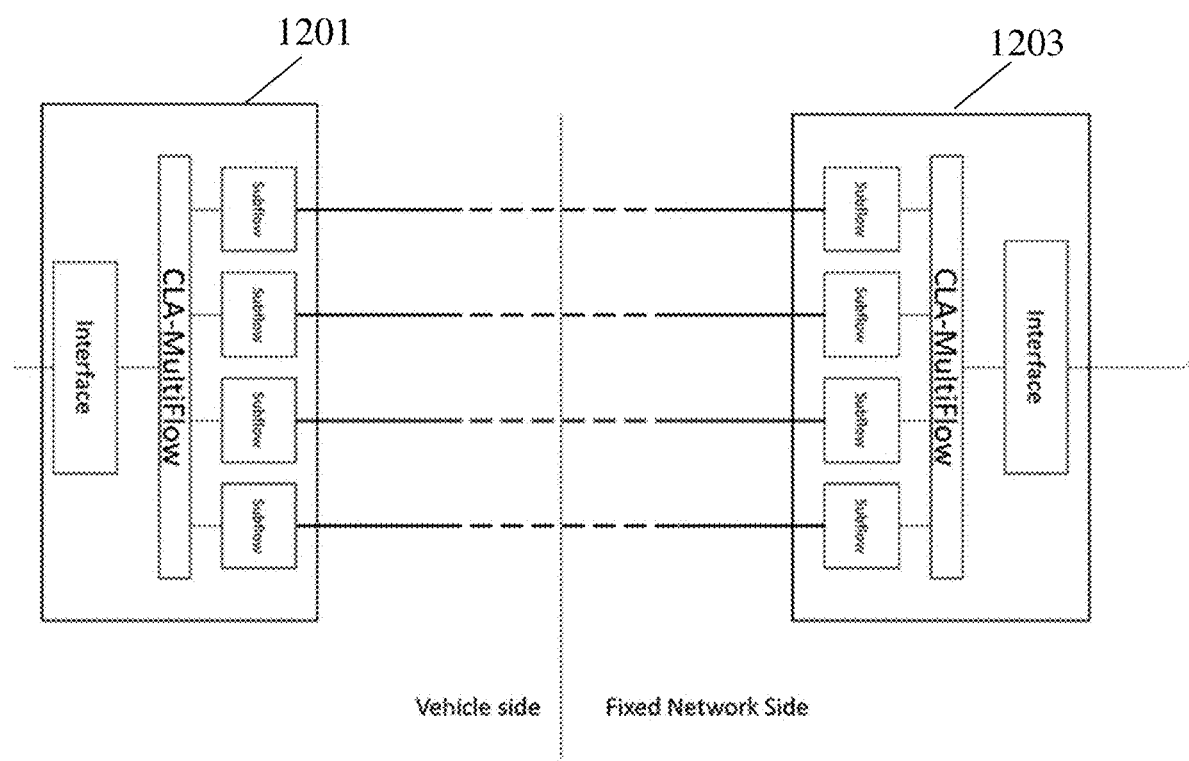
FIGS. 12 and 13 illustrate examples of elements of a multipath controller arrangement suitable for a wireless communication system in accordance with some embodiments of the invention.

FIG. 12 illustrates an example of two multipath controllers utilizing subflows of multiple paths for communication. In the example, a vehicle multipath controller 1201 may provide a single flow connection for the vehicle side network and a fixed network multipath controller 1101 may provide a single flow connection for the fixed network. The connection between the two multipath controllers is however by a plurality of subflows each of which may use a different path. Thus, a data packet received by one multipath controller 1201 may be communicated to the complementary multipath controller 1203 via one of the subflows/paths (and vice versa).

Figure 13:
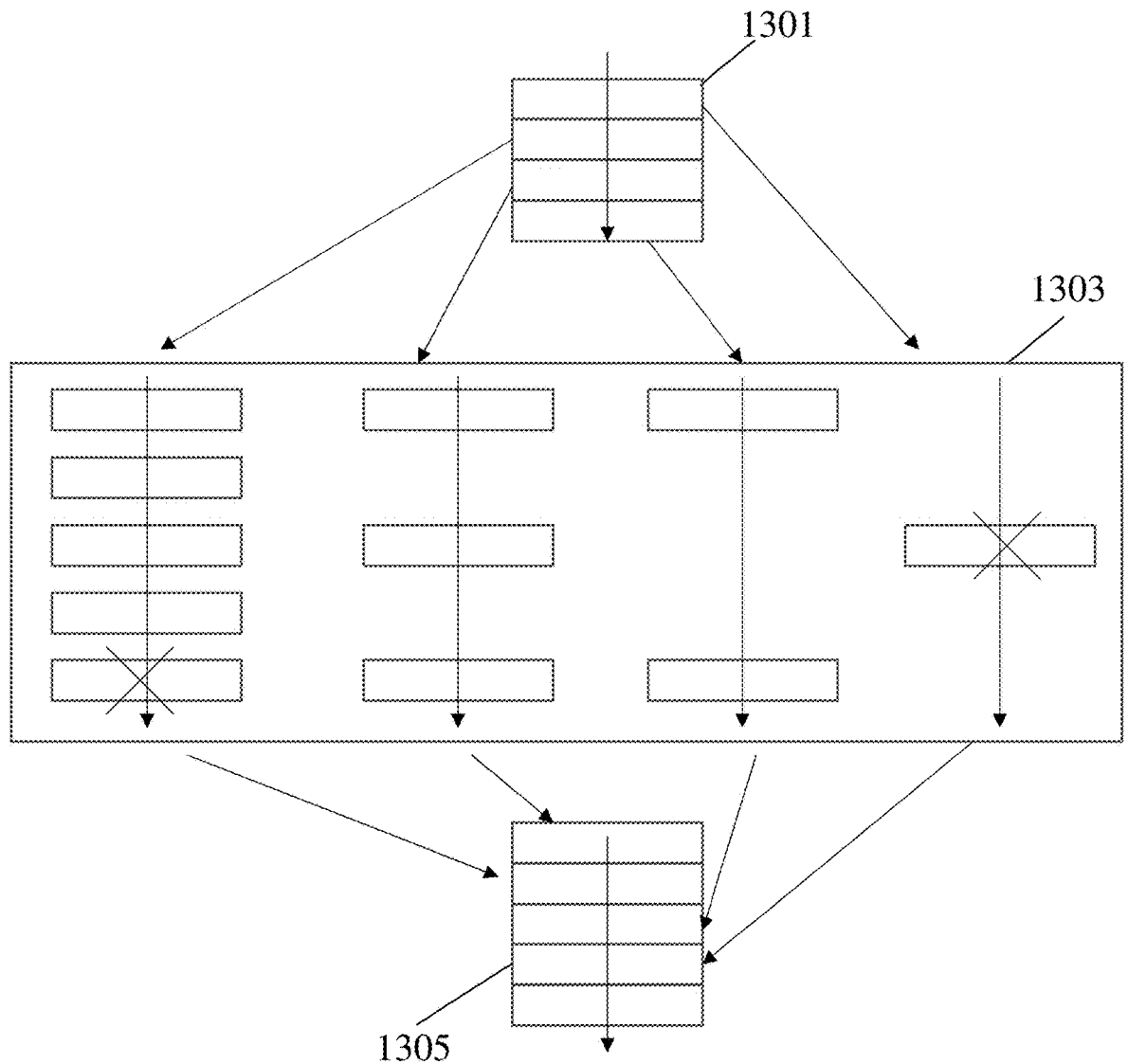

FIG. 13 illustrates an example of the operation of the multipath subflow communication. In the example, an input set of data packets 1301 are received in a given order. These may be routed via a plurality of subflows 1303 with data packets being distributed over the different subflows 1303. The subflows 1303 may then be combined into a single flow 1305, i.e. a single set of output data packets may be generated.

Due to different properties of the different subflows, the data packets may be received in a different order than in the input set of data packets 1301, and the receiving multipath controller may reorder the output data packets to have the correct order to generate and in-sequence data output.

In some embodiments, subflows/paths may be established via different wireless modems and mm wave radio communication links. Thus, different subflows may utilize different over the air mm wave radio communication links.

In some embodiments, the multipath controllers may be arranged to dynamically and flexibly manage the subflow communication. In some embodiments, the multipath controllers may be arranged to communicate data simultaneously over several paths/flows. For example, a multipath controller may maintain a FIFO buffer for each subflow and may allocate new data packets to subflows depending on the level of filling of each subflow buffer. In other embodiments, a slower or less flexible approach may be used. For example, the multipath controller may simply allocate data to one subflow as long as the buffer level does not increase above a given level. If this level is exceeded, it may indicate that the link/path for that subflow is no longer efficient (e.g. due to the mm wave radio communication links for that path no longer being able to support communication) and it may switch to exclusively use a different subflow for future communication.

In the example of FIG. 11, the vehicle 103 comprises a vehicle network multipath controller (MPC) 1105 which interworks with a complementary fixed network multipath controller of the fixed network. The vehicle network multipath controller 1105 is thus arranged to allocate data packets of a data session between the end node and the remote node to a plurality of communication paths/subflows with at least some of these being via different mm wave radio communication links.

In the example, the diversity controller 1101 is arranged to adapt the multipath controller operation in response to the multipath environment data, and specifically it is arranged to adapt the number of communication paths/subflows that are available for allocation of data packets in response to the multipath environment data. Thus, the number of subflows over different mm wave radio communication links to which data may be allocated may be dependent on the multipath environment data.

For example, in line with previous examples, the number of mm wave radio communication links that are established between wireless modems and the access points may depend on whether the multipath environment data indicates that substantial multipath propagation is present or not. In examples where all established mm wave radio communication links are used and available to the multipath controller, the number of subflows will be varied depending on the multipath environment data. In other examples, the number of subflows that are available for allocation of data packets may be modified by the diversity controller 1101 indicating e.g. a maximum number of subflows that is to be used.

In some embodiments, the diversity controller 1101 may thus be arranged to modify a number of the communication paths that are available for allocation of data packets in response to the multipath environment data.

In other embodiments, a more flexible approach may e.g. be used where the diversity controller 1101 is arranged to adapt a bias towards more or fewer subflows being used. For example, for the multipath environment data indicating no or little multipath propagation, the diversity controller 1101 may control the vehicle network multipath controller 1105 to be biased towards allocating data to the subflow that currently has the highest throughput thus resulting in a concentration towards one or a few subflows. If instead, the multipath propagation indicates a significant amount of multipath propagation being likely, the diversity controller 1101 may modify the allocation algorithm to have an increased bias towards distributing data packets over more subflows. Thus, the decision of which subflow to allocate data to may not only consider throughput of the individual subflows but may also seek to increase the diversity over multiple subflows.

In some embodiments, the diversity controller 1101 may be arranged to adapt the allocation of data packets to the plurality of communication paths in response to the multipath environment data by adapting how many repetitions of a data packet are allocated to subflows, and specifically to different subflows. For example, if the multipath environment data indicates that there is likely to be no multipath propagation, the diversity controller 1101 may control the vehicle multipath controller 1201 to allocate each data packet to a subflow in accordance with a suitable algorithm (e.g. to the one for which the buffer is the most empty). However, if the multipath environment data indicates that there is likely to be substantial multipath propagation, the diversity controller 1101 may control the vehicle multipath controller 1201 to allocate each data packet to two (or more) subflows, i.e. the data packet may be copied and transmitted along two subflows. The subflows may be selected in accordance with a suitable algorithm, such as e.g. by selecting the two subflows for which the buffers are most empty.

In such a system, the complementary multipath controller, i.e. the complementary multipath controller 1203, may receive the multiple data packets on different flows. In many embodiments, it may proceed to forward the data packets to a suitable functional entity where they may be compared or jointly received in some way as previously described.

In other embodiments, the complementary multipath controller may simply select one data packet and reject any copies that may also be received. Thus, if only one data packet is received, this may be forwarded in the network, and if more than one data packets are received then one is selected and forwarded. The selection may simply be a random selection of the first received data packet (e.g. passing a validation test) with all subsequent data packets with the same data packet sequence number being rejected. Such an approach may provide facilitated and efficient processing. Indeed, already deployed multipath controller implementations may have functionality included that rejects subsequent received data packets with the same sequence number. In such cases, the described multipath environment data adaptation approach can be implemented simply by equipping the access points with functionality for transmitting the multipath environment data and the vehicle with functionality for adapting the multipath controller operation as described. No further modifications are needed in the network to handle the adaptation or the potential for repeated data packet transmissions.

The previous discussion has focused on the adaptation of the uplink diversity operation in response to the multipath environment data. In some embodiments, the access point may also be arranged to adapt operation in response to a detection that the vehicle system has adapted the operation.

Specifically, the access point 109 may as illustrated in FIG. 10 comprise an uplink processor 1005 which is arranged to determine an uplink diversity operation characteristic for the transmissions from the wireless modems of the vehicle 103. The uplink processor 1005 may detect whether the transmissions from the vehicle 103 include repeated transmissions of the same data packet. For example, each data packet may be assigned a sequence number with repeated transmissions of the same data packet using the same sequence number. The uplink processor 1005 may detect that multiple data packets are received with the same sequence number and in response control the receiver to perform joint decoding of these. However, in addition, the uplink processor 1005 may determine that if a sufficient number or proportion of repeated data packets are received, then this is likely to indicate that the diversity controller 1101 has modified operation based on the received multipath environment data. In this case, the uplink processor 1005 may control the access point to modify the downlink operation, i.e. it may proceed to adapt the downlink transmissions in response to this detection.

The adaptation may correspond to the adaptation performed for the uplink direction. For example, the uplink processor 1005 may control the access point to perform repeated transmissions of the same data packet, use a plurality of mm wave radio communication links etc. It will be appreciated that the examples described previously may be applied equivalently to the downlink operation (mutatis mutandis).

In a similar fashion, the complementary multipath controller may perform an adaptation that mirrors the behavior of the multipath controller on the vehicle. For example, if it recognizes that packets are being duplicated by the multipath controller on the vehicle (by inspecting sequence numbers) it may determine to duplicate packets to be sent on the downlink, submitting this to the same or different subflows. This behavior may thus be triggered without recourse to any direct signaling from the access points. Such action is advantageous when the mmWave channel is approximately reciprocal, with multipath induced fading for both uplink and downlink.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims.

Specifically, a claim being defined as being dependent on claim 1 may be dependent on all previous claims, and specifically the reference to "claim 1" may be replaced by "of any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. A communication system for supporting communication between an end node of a vehicle and a remote correspondent node via a fixed network, the communication system comprising:
a plurality of wireless access points of the fixed network, each wireless access point having a directional antenna arrangement for mm wave radio communication using directional beams;
a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links;
wherein a first access point of the plurality of wireless access points is arranged to transmit multipath environment data for an area supported by the first access point to at least one of the plurality of wireless modems, the multipath environment data being indicative of nominal multipath properties for the area, the nominal multipath properties being indicative of a degree of multipath for the area independently of the vehicle and of any links formed to the vehicle; and
a controller of the vehicle is arranged to adapt a diversity property for transmissions of data from the plurality of wireless modems to the plurality of wireless access points in response to the multipath environment data;
wherein the multipath environment data comprises an indication of whether the area is a multipath propagation environment or a non-multipath propagation environment; and the vehicle is arranged to adapt the diversity property to increase diversity for the multipath environment data indicating the multipath propagation environment than for the multipath environment data indicating the non-multipath propagation environment.

2. The communication system of claim 1, wherein the diversity property is a data packet retransmission repetition property for data packets transmitted from the wireless modems to the wireless access points.

3. The communication system of claim 2, wherein the data packet transmission repetition property is a minimum number of repeated transmissions of at least a first data packet.

4. The communication system of claim 2, wherein the data packet transmission repetition property is a minimum number of repeated transmissions of at least a first data packet over a single mm wave radio communication link.

5. The communication system of claim 2, wherein the data packet transmission repetition property is a minimum number of repeated transmissions of at least a first data packet to the first access point.

6. The communication system of claim 2, wherein the data packet transmission repetition property is a minimum number of repeated transmissions of at least a first data packet over a plurality of mm wave radio communication links.

7. The communication system of claim 2, wherein the data packet transmission repetition property is a minimum number of repeated transmissions of at least a first data packet over mm wave radio communication links to more than one of the plurality of wireless access points.

8. The communication system of claim 1, wherein the controller is arranged to adapt how many mm wave radio communication links are formed to the plurality of wireless access points in response to the multipath environment data.

9. The communication system of claim 1, wherein the controller is arranged to adapt how many mm wave radio communication links are formed to the first wireless access point in response to the multipath environment data.

10. The communication system of claim 1, wherein the controller comprises a multi path controller arranged to allocate data packets of a data session between the end node and the remote node to a plurality of communication paths, at least some of the plurality of communication paths including different mm wave radio communication links;

and where the controller is arranged to adapt the allocation of data packets to the plurality of communication paths in response to the multipath environment data.

11. The communication system of claim 1, wherein the controller is arranged to increase diversity for the transmissions for the multipath environment data indicating an environment with increased multipath propagation.

12. The communication system of claim 1, wherein the multipath environment data comprises an indication of multipath induced fading in the area.

13. The communication system of claim 1, wherein the multipath environment data comprises static environment data.

14. The communication system of claim 1, wherein the multipath environment data is for a predetermined route.

15. The communication system of claim 14, wherein the multipath environment data comprises an indication that the predetermined route includes a tunnel.

16. The communication system of claim 1, wherein the first access point comprises a circuit arranged to determine an uplink diversity characteristic for transmissions received from the plurality of wireless modems, and to adapt a downlink diversity parameter for transmissions of data to the plurality of wireless modems in response to the uplink diversity characteristic.

17. A method of operation for a communication system supporting communication between an end node of a vehicle and a remote correspondent node via a fixed network, the communication system comprising:
- a plurality of wireless access points of the fixed network, each wireless access point having a directional antenna arrangement for mm wave radio communication using directional beams;
- a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the method comprising:
- a first access point of the plurality of wireless access points transmitting multipath environment data for an area supported by the first access point to at least one of the plurality of wireless modems, the multipath environment data being indicative of nominal multipath properties for the area, the nominal multipath properties being indicative of a degree of multipath for the area independently of the vehicle and of any links formed to the vehicle; and
- a controller of the vehicle adapting a diversity property for transmissions of data from the plurality of wireless modems to the plurality of wireless access points in response to the multipath environment data;
- wherein the multipath environment data comprises an indication of whether the area is a multipath propagation environment or a non-multipath propagation environment; and the vehicle adapts the diversity property to increase diversity for the multipath environment data indicating the multipath propagation environment than for the multipath environment data indicating the non-multipath propagation environment.

18. An apparatus for a communication system supporting communication between an end node of a vehicle and a remote correspondent node via a fixed network, the communication system comprising:
- a plurality of wireless access points of the fixed network, each wireless access point having a directional antenna arrangement for mm wave radio communication using directional beams;
- a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the apparatus comprising:
- a receiver for receiving multipath environment data from a first access point of the plurality of wireless access points, the multipath environment data being indicative of nominal multipath properties for the area, the nominal multipath properties being indicative of a degree of multipath for the area independently of the vehicle and of any links formed to the vehicle; and
- a controller arranged to adapt a diversity property for transmissions of data from the plurality of wireless modems to the plurality of wireless access points in response to the multipath environment data;
- wherein the multipath environment data comprises an indication of whether the area is a multipath propagation environment or a non-multipath propagation environment; and the vehicle is arranged to adapt the diversity property to increase diversity for the multipath environment data indicating the multipath propagation environment than for the multipath environment data indicating the non-multipath propagation environment.

* * * * *